United States Patent [19]

Vermeiren et al.

[11] Patent Number: 4,511,837
[45] Date of Patent: Apr. 16, 1985

[54] MEASURING SYSTEM FOR MEASURING THE VARIATION OF THE CAPACITIVE IMPEDANCE OF A BEARING INSTALLED IN A HOUSING

[75] Inventors: Karel N. Vermeiren, Woerden; Hendrik Dolfsma, Nieuwegein, both of Netherlands

[73] Assignee: SKF Industrial Trading & Development Co., B.V., Netherlands

[21] Appl. No.: 389,000

[22] Filed: Jun. 17, 1982

[30] Foreign Application Priority Data

Jun. 30, 1981 [NL] Netherlands ............... 8103161

[51] Int. Cl.³ ............................................. G01R 27/26
[52] U.S. Cl. ................................... 324/61 R; 340/682
[58] Field of Search ..................... 324/61 P, 61 R; 340/682; 246/169 A

[56] References Cited

U.S. PATENT DOCUMENTS 3,000,101  9/1961  Giardino et al. ............... 324/61 P
3,176,286  3/1965  Dschen ........................... 324/61 P
3,904,940  9/1975  Burrus ............................ 340/682

FOREIGN PATENT DOCUMENTS 640197  12/1978  U.S.S.R. ........................ 324/61 R

Primary Examiner—Stanley T. Krawczewicz
Attorney, Agent, or Firm—Eugene E. Renz, Jr.

[57] ABSTRACT

A system for measuring the variation in the capacitance of a bearing installed on a shaft in a housing. It is shown to include an electrically conductive measuring ring interposed between the bearing and the housing, an insulating layer surrounding the measuring ring wherein the insulating layer between the bearing and the measuring ring is considerably thinner than the remaining portion of the insulating layer, and measuring means connected to the measuring ring and the shaft to measure the variations in the capacitance of the bearing. In such a system, capacitance measurements are made without significant interference from the capacitance existing between the housing and the shaft.

19 Claims, 3 Drawing Figures

MEASURING SYSTEM FOR MEASURING THE VARIATION OF THE CAPACITIVE IMPEDANCE OF A BEARING INSTALLED IN A HOUSING

The invention relates to a measuring system for measuring the variation of the capacitive impedance of a bearing installed in a housing, such as, for example, a rolling bearing or a sliding bearing, to a bearing and to a measuring ring intended for application in such a measuring system or bearing.

It is well known that the condition of lubrication of a bearing may be controlled by measuring the capacitive impedance of the bearing. In a known measuring system of the type mentioned above, the measuring system in a ball bearing, for example, is connected thereto on the inside and outside races of the ball bearing. Here, however, allowance must be made for the capacitance which is present between the housing in which the ball bearing is installed and the shaft supported by the bearing, since this capacitance is parallel to the capacitive impedance of the bearing. Under some circumstances the influence of this capacitance may be so great that reliable measurement of the capacitive impedance of the bearing is no longer possible.

The object of the invention is to procure a measuring system of the type mentioned at the beginning wherein this disadvantage is obviated in a simple but nevertheless effective way.

For this purpose the measuring system pursuant to the invention is characterized by a metal measuring ring which fittingly surrounds the outer side of the bearing and of which at least the portions of the surface being in contact with the bearing in the housing are coated with an insulating layer, while the portion of the insulating layer being in contact with the bearing is designed considerably thinner than the remaining portion of the insulating layer.

In this way the influence of the capacitance between the housing and the shaft is almost eliminated, by virtue of a relatively small capacitance being connected in series with this capacitance, while a relatively great capacitance is connected in series with the capacitive impedance of the bearing, which capacitance may serve as the customary series condenser of the measuring system. The electrical part of the measuring system, designed in the conventional manner, is here connected to the metal measuring ring and the shaft supported by the bearing.

An additional object of the invention is to procure a bearing such as, for example, a rolling bearing or a sliding bearing, which may in simple fashion be incorporated in the measuring system described.

For this purpose the bearing pursuant to the invention is characterized by a metal measuring ring fittingly surrounding the outer side of the bearing and coated with an insulating layer, the portion of the insulating layer being in contact with the bearing being designed considerably thinner than the remaining portion of the insulating layer.

Finally, the object of the invention is to procure a measuring ring intended for application in a measuring system or a bearing pursuant to the invention.

Pursuant to the invention, the measuring ring is characterized by being coated with an insulating layer, the portion of the insulating layer located on the inner surface being designed considerably thinner than the remaining portion of the insulating layer.

The invention is explained in greater detail below by means of the drawing, representing one embodiment of the measuring system pursuant to the invention, wherein FIG. 1 represents an embodiment of the measuring system pursuant to the invention, in which part of a shaft supported by ball bearings and a ball bearing installed in a housing are visible.

Figure 1:
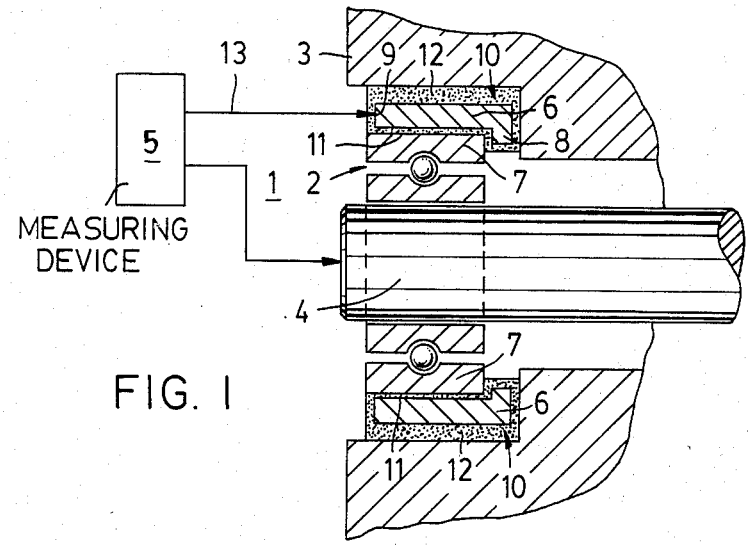

In FIG. 1 is represented a measuring system 1 for measuring the capacitance $C_b$ of a ball bearing 2. The ball bearing 2 is installed in a housing 3, partially represented, and forms one of the bearings by which a partially visible shaft 4 is supported.

The measuring system 1 comprises a measuring device 5 designed in known manner. The measuring device 5 is connected to a metal measuring ring 6 fittingly surrounding the outer race 7 of the ball bearing 2. In the embodiment represented the measuring ring 6 has a flanged edge 8, directed radially inward at one axial end.

Figure 2:
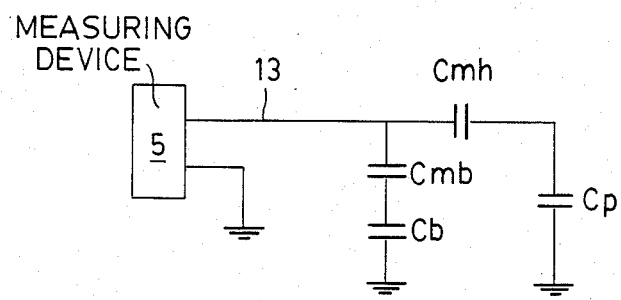
FIG. 2 represents the equivalent circuit of the capacitances present in FIG. 1.

The measuring ring 6, with the exception of the place of connection 9 before the measuring device 5, is coated with an insulating layer 10, the portion 11 of the insulating layer 10 being in contact with the outer race 7 being designed considerably thinner than the remaining portion 12 of the insulating layer 10. If desired, it will suffice to arrange an insulating layer on the surfaces of the measuring ring 6 coming into contact respectively with the other race 7 and the housing 3. Application of the measuring ring 6 produces two capacitances which in the equivalent circuit of FIG. 2 are indicated respectively by $C_{mb}$ and $C_{mh}$. The capacitance $C_{mb}$ is the capacitance appearing between the measuring ring 6 and the outer race 7 and the capacitance $C_{mh}$ is the capacitance appearing between the measuring ring 6 and the housing 3. Since $$C = (\epsilon_0 \epsilon_R A / d)$$

wherein A is the area of contact and d the layer thickness, applies for the magnitude of these capacitances, the capacitance $C_{mb}$ will be much greater than the capacitance $C_{mh}$. The thickness of the insulating-layer portion 11 may, for example, be 7–15 μm, wherefor, depending upon the dimensions of the measuring ring 6 and the relative dielectric constant $\epsilon_r$ of the insulating layer 10, a capacitance value of 100–3000 pF is obtained for the capacitance $C_{mb}$. The thickness of the insulating-layer portion 12 is here selected four to ten times greater, so that the value of the capacitance $C_{mh}$ amounts to approximately 10–20 pF.

In this way the influence of the capacitance $C_p$, which appears between the housing 3 and the shaft 4 and which without use of the measuring ring 6 would be parallel to the capacitance $C_b$ of the ball bearing 2, becomes negligibly small, so that the value of the capacitance $C_b$ may be derived with great accuracy from the variations of current appearing in the connecting circuit 13 of the measuring device 5.

The insulating layer 10 consists preferably of aluminum oxide, by which the rigidity of the structure is not disadvantageously influenced. If desired, a layer of synthetic resin, such as, for example, teflon, may in addition be applied on the aluminum oxide.

Figure 3:
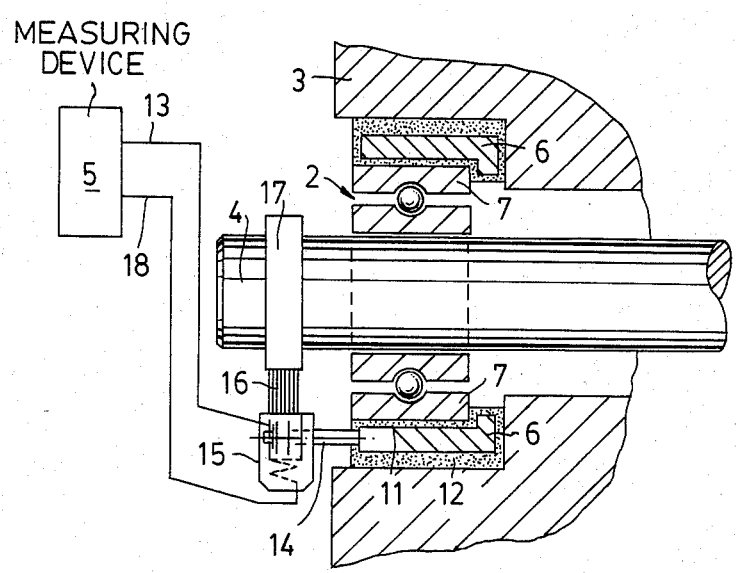
FIG. 3 represents the embodiment of the invention shown in FIG. 1, in which connection with a capacitance measuring device is more particularly shown.

FIG. 3 represents a simple practical execution of the connection in the measuring system. The measuring ring 6 is provided with a pin 14 extending in an axial direction and carrying a brush holder 15. This holder is insulated from pin 14. The holder comprises carbon brushes 16 which cooperate with a collector 17. By means of connecting lines 13, 18, the measuring device 5 is connected with pin 14 and brushes 16 respectively.

The invention is not limited to the embodiment described above, which may be modified in a variety of ways within the scope of the invention.

What is claimed is:

1. Measuring system for measuring variations in the capacitance of a bearing installed on a shaft in a housing, comprising an electrically conductive measuring ring interposed between the bearing and the housing, an insulating layer surrounding the measuring ring, wherein the insulating layer between the bearing and the measuring ring is considerably thinner than the remaining portion of the insulating layer, and measuring means connected to the measuring ring and the shaft, such that variations in the capacitance of the bearing are measured without significant interference from the capacitance existing between the housing and the shaft.

2. Measuring system according to claim 1, wherein said measuring ring further comprises at one axial end thereof, a flanged edge directed radially inward.

3. Measuring system according to claim 1, wherein said insulating layer comprises aluminum oxide.

4. Measuring system according to claim 1, further comprising a second layer of synthetic resin surrounding said insulating layer.

5. Measuring system according to claim 4, wherein said layer of synthetic resin comprises TEFLON.

6. Measuring system according to claim 1, wherein that portion of the insulating layer between said measuring ring and said bearing is in the range of 4 to 10 times thinner than the remaining portion of the insulating layer.

7. Measuring system according to claim 7, wherein the capacitance between said measuring ring and said housing is in the range of 10 to 20 pico Farads and wherein the capacitance existing between said measuring ring and said bearing is in the range of 100 to 3,000 pico Farads.

8. A bearing comprising an inner ring, an outer ring, a plurality of rolling elements interposed between the rings, and an electrically conductive measuring ring, fittingly surrounding the outer ring, which measuring ring is coated with an insulating layer, wherein the portion of the insulating layer between the outer ring and the measuring ring is considerably thinner than the remaining portion of the insulating layer.

9. Measuring system according to claim 8, wherein said measuring ring further comprises at one axial end thereof, a flanged edge directed radially inward.

10. Measuring system according to claim 8, wherein said insulating layer comprises aluminum oxide.

11. Measuring system according to claim 8, further comprising a second layer of synthetic resin surrounding said insulating layer.

12. Measuring system according to claim 11, wherein said layer of synthetic resin comprises TEFLON.

13. Measuring system according to claim 8, wherein that portion of the insulating layer between said measuring ring and said bearing is in the range of 4 to 10 times thinner than the remaining portion of the insulating layer.

14. A measuring ring, for use in a system for measuring the capacitance of a bearing, comprising an electrically conductive ring formed to fittingly surround the bearing, which electrically conductive ring is coated with an insulating layer, wherein the portion of the insulating layer located between the electrically conductive ring and the bearing is considerably thinner than the remaining portion of the insulating layer.

15. Measuring system according to claim 14, wherein said measuring ring further comprises at one axial end thereof, a flanged edge directed radially inward.

16. Measuring system according to claim 14, wherein said insulating layer comprises aluminum oxide.

17. Measuring system according to claim 14, further comprising a second layer of synthetic resin surrounding said insulating layer.

18. Measuring system according to claim 14, wherein said layer of synthetic resin comprises TEFLON.

19. Measuring system according to claim 14, wherein that portion of the insulating layer between said measuring ring and said bearing is in the range of 4 to 10 times thinner than the remaining portion of the insulating layer.

* * * * *